(12) United States Patent
Viswanath et al.

(10) Patent No.: US 12,167,358 B2
(45) Date of Patent: Dec. 10, 2024

(54) RECOVERING SERVICE IN A RADIO ACCESS TECHNOLOGY (RAT) FOR A MULTI-MODE USER EQUIPMENT

(71) Applicant: Apple Inc., Cupertino, CA (US)

(72) Inventors: Vinay Mysore Viswanath, San Diego, CA (US); Nirlesh Koshta, Bangalore (IN); Kavya B. Ravikumar, San Diego, CA (US)

(73) Assignee: Apple Inc., Cupertino, CA (US)

( * ) Notice: Subject to any disclaimer, the term of this patent is extended or adjusted under 35 U.S.C. 154(b) by 259 days.

(21) Appl. No.: 17/843,634

(22) Filed: Jun. 17, 2022

(65) Prior Publication Data

US 2022/0408393 A1    Dec. 22, 2022

(30) Foreign Application Priority Data

Jun. 18, 2021 (IN) .............................. 202141027431

(51) Int. Cl.
*H04W 60/00* (2009.01)
(52) U.S. Cl.
CPC ................................. *H04W 60/00* (2013.01)
(58) Field of Classification Search
CPC .................................................... H04W 88/06
See application file for complete search history.

(56) References Cited

U.S. PATENT DOCUMENTS

| 9,860,816 B2 | 1/2018 | Komati et al. |
| 10,575,278 B2 | 2/2020 | Kim et al. |
| 11,496,958 B2 | 11/2022 | Chen |
| 2012/0163301 A1 | 6/2012 | Jang |
| 2015/0264738 A1 | 9/2015 | Lee et al. |
| 2019/0059051 A1* | 2/2019 | Åström ............... H04W 52/028 |
| 2019/0261249 A1* | 8/2019 | Xiong ................... H04W 28/02 |
| 2020/0383028 A1 | 12/2020 | Lin et al. |
| 2021/0329514 A1* | 10/2021 | Chin ............. H04W 36/008375 |

FOREIGN PATENT DOCUMENTS

| CN | 108141842 A | 6/2018 | |
| CN | 108781405 A | 11/2018 | |
| CN | 112534957 A | 3/2021 | |
| KR | 20210009381 A * | 1/2021 | ............ H04W 92/18 |
| WO | WO-2020180071 A1 * | 9/2020 | ........ H04W 36/0079 |

OTHER PUBLICATIONS

First Examination Report for Indian Application No. 202141027431 mailed Feb. 14, 2023, 6 pages.
Office Action and Search Report directed to related Chinese Application No. 202210670169.2, with machine translation attached, mailed Aug. 20, 2024; 10 pages.

* cited by examiner

*Primary Examiner* — Kevin Kim
(74) *Attorney, Agent, or Firm* — Sterne, Kessler, Goldstein & Fox P.L.L.C.

(57) ABSTRACT

Some aspects of this disclosure relate to apparatuses and methods for implementing techniques for support recovering service in a radio access technology (RAT) for a multi-mode user equipment (UE). The UE can be registered to communicate in a first RAT, and the UE is in an idle mode, and the UE is in a disable mode with respect to communication in the second RAT. A cell selection for the second RAT can be performed. Afterwards, a registration procedure with a wireless communication system to communicate in the second RAT can be performed. Hence, the UE can receive wireless service from the wireless communication system through a base station associated with the second RAT.

20 Claims, 8 Drawing Sheets

RECOVERING SERVICE IN A RADIO ACCESS TECHNOLOGY (RAT) FOR A MULTI-MODE USER EQUIPMENT

CROSS-REFERENCE TO RELATED APPLICATIONS

This application claims priority to Indian Application No. 202141027431, entitled "RECOVERING SERVICE IN A RADIO ACCESS TECHNOLOGY (RAT) FOR A MULTI-MODE USER EQUIPMENT (UE)", filed Jun. 18, 2021, the contents of which are hereby incorporated by reference herein in its entirety.

BACKGROUND

Field

The described aspects generally relate to recovering service in a radio access technology (RAT) for a multi-mode user equipment (UE) supporting multiple RATs.

Related Art

A radio access technology (RAT) is the underlying physical connection method for a radio based wireless communication network. A multi-mode user equipment (UE) can support several RATs in one device such as Bluetooth, Wi-Fi, global system for mobiles (GSM), universal mobile telecommunications system (UMTS), or long-term evolution (LTE). In addition, the 3rd Generation Partnership Project (3GPP) has developed a new RAT known as fifth generation (5G) New Radio (NR) RAT. A multi-mode UE supporting several RATs can provide flexibility and conveniences to the users. However, it is desired to improve the operational efficiency for a multi-mode UE.

SUMMARY

Some aspects of this disclosure relate to apparatuses and methods for implementing mechanisms to support recovering service in a radio access technology (RAT) for a multi-mode user equipment (UE). A multi-mode UE can wirelessly communicate in at least a first RAT and a second RAT, such as a RAT different from a fifth generation (5G) New Radio (NR) RAT and the NR RAT. The NR RAT can provide more services to the user, but NR networks may not be available all of the time and in all situations. Sometimes, a UE can communicate in the first RAT, while being disabled to communicate in the second RAT. A timer can be configured to count an amount of time the UE being in a disable mode with respect to communication in the second RAT. Once the timer has expired, the UE can recover services in the second RAT. Embodiments herein provide mechanisms for the UE to recover services in the second RAT upon the expiration of a timer.

Some aspects of this disclosure relate to a multi-mode UE. The UE can include one or more transceivers and a processor communicatively coupled to one or more transceivers. The one or more transceivers can enable the UE to wirelessly communicate in a first RAT and a second RAT. In some embodiments, the UE communicates in the first RAT of a public land mobile network (PLMN), and communicates in the second RAT of the same PLMN. In some other embodiments, the UE communicates in the first RAT of a first PLMN, and communicates in the second RAT of a second PLMN different from the first PLMN. In some examples, the first PLMN has a first priority, and the second PLMN has a second priority equal to or higher than the first priority. In addition, a protocol stack can be operated on the UE by the processor. The protocol stack can include a non-access stratum (NAS) layer and an access stratum (AS) layer including multiple sublayers such as a Radio Resource Control (RRC) layer.

According to some aspects, the processor of the UE can be configured to determine, by a NAS layer of the protocol stack, the UE is registered to communicate in the first RAT, and the UE is in an idle mode. The processor can be further configured to determine, by the NAS layer, a timer has expired, where the timer is configured to count an amount of time the UE being in a disable mode with respect to communication in the second RAT. In addition, the processor can be configured to send, by the NAS layer, responsive to the determination that the UE is in the idle mode in the first RAT and the timer has expired, a request to a RRC layer of the protocol stack to perform a cell selection for the second RAT. Afterwards, the processor can be configured to receive, by the NAS layer and from the RRC layer, an indication that the cell selection has been performed successfully to communicate in the second RAT. The RRC layer sends the indication after listening to system information from a base station associated with the second RAT and selecting the base station for wireless communication in the second RAT. In some examples, the selecting the base station for wireless communication in the second RAT can include selecting the base station by using a previously stored frequency list or by performing a band search of multiple bands.

Moreover, the processor can be configured to perform, by the NAS layer and responsive to receiving the indication that the cell selection has been performed successfully, a registration procedure with a wireless communication system including the base station to communicate in the second RAT. After performing the registration procedure, the processor can be configured to receive wireless service from the wireless communication system through the base station associated with the second RAT. Hence, the UE has recovered service in the second RAT.

Additionally, the processor of the UE can be configured to perform wireless communication in the first RAT when the UE is in a mode different from the idle mode so that the normal service of the UE in the first RAT would not be interrupted. Furthermore, when the NAS layer does not receive from the RRC layer the indication that the cell selection has been performed successfully to communicate in the second RAT, the processor can be configured to continue being registered to communicate in the first RAT.

According to some aspects, the first RAT can include universal mobile telecommunications system (UMTS) terrestrial radio access network (UTRAN), or global system for mobiles (GSM) edge radio access network (GERAN), while the second RAT can include NR next generation radio access network (NG-RAN). In some examples, the first RAT can be a lower priority RAT compared to the second RAT. In some examples, the one or more transceivers can be configured to enable the UE to wirelessly communicate in long-term evolution (LTE) evolved UTRAN (E-UTRAN). The processor can be further configured to select a LTE base station for wireless communication in the LTE E-UTRAN, communicate with the LTE base station in the LTE E-UTRAN, and select a NR base station for wireless communication in NG-RAN after communicating with the LTE base station. The timer can be configured to count an amount of time for the UE being in the disable mode with respect to communication in NG-RAN or in LTE E-UTRAN.

Some aspects of this disclosure relate to a method performed by a UE. The method includes determining that a UE is registered to communicate in a first RAT, and the UE is in an idle mode. The method further includes determining that a timer has expired, where the timer is configured to count an amount of time the UE being in a disable mode with respect to communication in the second RAT different from the first RAT. Moreover, the method includes performing, responsive to the determination that the UE is in the idle mode in the first RAT and the timer has expired, a cell selection for the second RAT. The performing the cell selection can include listening to system information from a base station associated with the second RAT and selecting the base station for wireless communication in the second RAT. Responsive to successfully performing the cell selection for the second RAT, the method includes performing a registration procedure with a wireless communication system to communicate in the second RAT. After performing the registration procedure, the method includes receiving wireless service from the wireless communication system through a base station associated with the second RAT.

Some aspects of this disclosure relate to non-transitory computer-readable medium storing instructions. When executed by a processor of a UE, the instructions stored in the non-transitory computer-readable medium cause the UE to perform various operations. The operations include determining a UE is registered to communicate in a first RAT, and the UE is in an idle mode. The operations further include determining a timer has expired, where the timer is configured to count an amount of time for the UE being in a disable mode with respect to communication in the second RAT different from the first RAT. Moreover, the operations include performing, responsive to the determination that the UE is in the idle mode in the first RAT and the timer has expired, a cell selection for the second RAT. Responsive to successfully performing the cell selection for the second RAT, the operations include performing a registration procedure with a wireless communication system to communicate in the second RAT. After performing the registration procedure, the operations include receiving wireless service from the wireless communication system through a base station associated with the second RAT.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
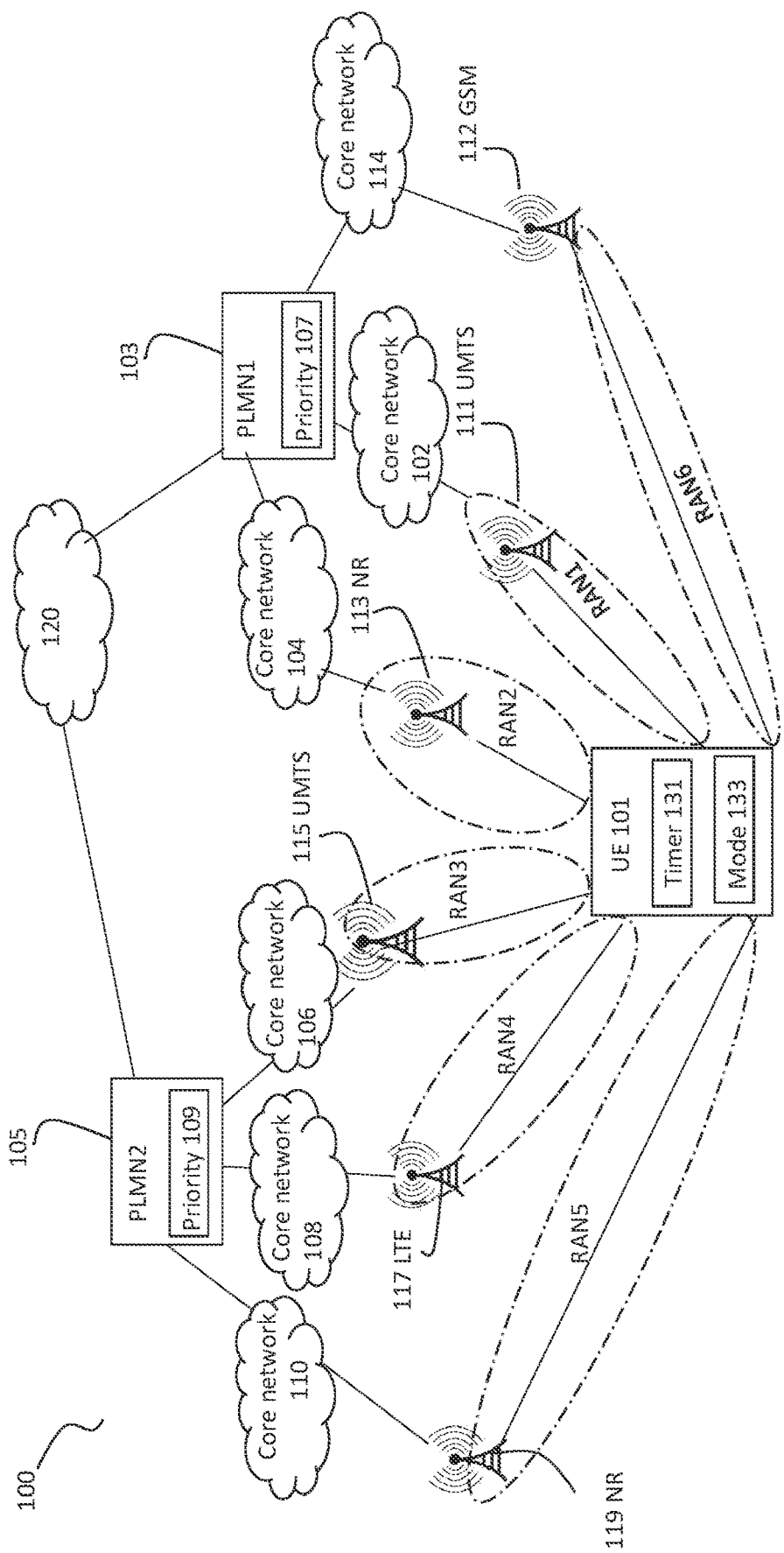
FIG. 1 illustrates a wireless system including a multi-mode user equipment (UE) configured to recover service in a radio access technology (RAT) among multiple RATs, according to some aspects of the disclosure.

The present disclosure is described with reference to the accompanying drawings.

In the drawings, generally, like reference numbers indicate identical or functionally similar elements. Additionally, generally, the left-most digit(s) of a reference number identifies the drawing in which the reference number first appears.

DETAILED DESCRIPTION

A multi-mode user equipment (UE) can support multiple radio access technologies (RATs) for wireless communication such as Bluetooth, Wi-Fi, global system for mobiles (GSM), universal mobile telecommunications system (UMTS), long-term evolution (LTE), or fifth generation (5G) new radio (NR). NR technology can provide services and applications to users with improved user experiences. However, sometimes, the NR network may not be available, and the UE may temporarily disable the NR RAT, which may be referred as N1 mode disabled. For example, the UE can temporarily disable the NR RAT when maximum registration attempts have been reached, when internet protocol (IP) multimedia subsystem (IMS) voice over NR is not available in the registration area, or when the UE registration is rejected due to network congestion, or other abnormal rejection causes. Some more examples and details when a RAT can be disabled can be found in some standard documents such as 3GPP 24.501, section 4.9.2, section 5.5.1.3.7, or other similar references known to one having ordinary skills in the arts. In some examples, instead of disabling the NR RAT, a UE can disable the LTE RAT as well.

According to some aspects, when the NR RAT is disabled due to various reasons, UE can start an implementation-specific timer to count an amount of time for the UE being in a disable mode for the NR RAT. A UE is in a disable mode when the NR RAT is disabled. In some examples, the timer can have a default value of 720 seconds. The timer can be of other values as well. At the meantime, the UE can attempt to select and register on a different RAT like LTE, UMTS, or GSM. Upon the expiration of the timer, the UE can re-enable the NR RAT. When the UE re-enables the NR RAT at the expiration of the timer, the UE can perform a NR cell re-selection procedure to enable the NR RAT and acquire service. Such a process can be referred to as recovering service in the NR RAT. In some other examples, UE can use NR cell re-selection to camp and register on the NR-RAT.

According to some aspects, if the UE is registered to the LTE RAT when the NR RAT is re-enabled, UE can perform cell re-selection based on the re-selection configurations defined by the LTE network in order to recover services in the NR RAT. However, if the UE is registered to the GSM RAT or the UMTS RAT when the NR RAT is re-enabled, UE cannot perform a direct cell re-selection to move to the NR RAT from the GSM RAT or UMTS RAT since the 3GPP specifications have not defined such direct interworking between the GSM/UMTS and NR RATs. Some current systems may return back to the NR RAT service by the re-selection to the LTE RAT and then from the LTE RAT onto the NR RAT. If LTE cells are not available at this point or the LTE RAT is disabled, then the NR re-selection would not be triggered. UE may remain camped on the GSM/UMTS RATs for a longer period of time in an area with good NR coverage, which may lead to degrade of user experience and customer dissatisfaction.

Embodiments herein present solutions to improve the NR RAT service recovery via a proactive attempt by the UE to trigger background NR cell selection or public land mobile network (PLMN) selection when some conditions are met, such as the N1 mode re-enable timer has expired, the N1 mode is re-enabled, and the UE is registered on the GSM RAT or the UMTS RAT. Upon re-enabling N1 mode, if the UE is registered on the GSM RAT or the UMTS RAT on the PLMN where N1 mode capability for 3GPP access was disabled, the UE can trigger a background cell selection on the NR RAT on the same PLMN. If the UE is registered on the GSM RAT or the UMTS RAT on a PLMN different from the PLMN where the N1 mode capability for 3GPP access was disabled, the UE can trigger a background PLMN selection to recover service on the NR RAT. The term of background NR cell selection or the background PLMN selection refers to the condition that the UE performs the NR cell selection or the PLMN selection when the UE is in an idle mode in the current registered RAT, such as the GSM RAT or the UMTS RAT. The idle mode can refer some other modes when the UE does not perform active data transfer or signaling so that services to active applications would not be interrupted. If UE is in connected mode, then UE waits to return to IDLE mode when no active data transfer happens.

Accordingly, embodiments herein can recover or acquire NR RAT services from GSM/UMTS registered state irrespective of availability of an LTE cell or even when LTE RAT is disabled. Embodiments herein can recover the NR RAT service without going through a two-step re-selection and registration process, which is going from the UMTS/GSM RAT to the LTE RAT, and further from the LTE RAT to the NR RAT. Hence, embodiments herein can avoid the additional signaling used for the two-step re-selection and registration process. The NR cell selection can be performed in background to avoid any service disruption on the GSM/UMTS RAT service. Therefore, user experience is not compromised while camped on the GSM/UMTS RAT. The UE may not remain stuck on the GSM/UMTS RATs in a NR coverage area which helps to improve user experiences because many of the NR based applications cannot be supported on lower bandwidths of the GSM/UMTS RATs.

FIG. 1 illustrates a wireless system 100 including a multi-mode UE, e.g., UE 101, configured to recover service in a RAT among multiple RATs, according to some aspects of the disclosure. Wireless system 100 is provided for the purpose of illustration only and does not limit the disclosed aspects. Wireless system 100 can include, but is not limited to, UE 101, a base station 111, a base station 113, a base station 115, a base station 117, and a base station 119, a public land mobile network (PLMN) 103, a PLMN 105, and various core networks, such as a core network 102, a core network 104, a core network 106, a core network 108, and a core network 110, all communicatively coupled to a core network 120.

According to some aspects, base station 111, base station 112, base station 113, base station 115, base station 117, and base station 119 can be a fixed station or a mobile station. Base station 111, base station 112, base station 113, base station 115, base station 117, and base station 119 can also be called other names, such as a base transceiver system (BTS), an access point (AP), a transmission/reception point (TRP), an evolved NodeB (eNB), a next generation node B (gNB), a 5G node B (NB), or some other equivalent terminology. In some examples, base station 111, base station 112, base station 113, base station 115, base station 117, and base station 119 can be interconnected to one another and/or to other base station or network nodes in a network through various types of backhaul interfaces such as a direct physical connection, a virtual network, and/or the like, not shown.

According to some aspects, UE 101 can be a multi-mode UE supporting multiple RATs. UE 101 can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a wireless sensor, a tablet, a camera, a video surveillance camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, base station 111 can be a UMTS base station, and UE 101 can wirelessly communicate in a first RAT with base station 111 in RAN1, which can be a UMTS terrestrial radio access network (UTRAN). Base station 111 and core network 102 can form a UMTS wireless communication system. In addition, base station 113 can be a NR base station, and UE 101 can wirelessly communicate in a second RAT with base station 113 in RAN2, which can be a next generation radio access network (NG-RAN). Base station 113 and core network 104 can form a NR wireless communication system. Furthermore, base station 111 and the GERAN, base station 113 and the NG-RAN are managed by the same PLMN 103. PLMN 103 can have a priority 107. Base station 112 can be a GSM base station, and UE 101 can wirelessly communicate in a RAT with base station 112 in RAN6, which can be a GSM edge radio access network (GERAN). Base station 112 and core network 114 can form a GSM wireless communication system.

According to some aspects, base station 115 can be a UMTS base station, and UE 101 can wirelessly communicate in a RAT with base station 115 in RAN3, which can be a UMTS terrestrial radio access network (UTRAN). Base station 115 and core network 106 can form a UMTS wireless communication system. Moreover, base station 117 can be a LTE base station, and UE 101 can wirelessly communicate in a RAT with base station 117 in RAN4, which can be a LTE evolved UTRAN (E-UTRAN). Base station 117 and core network 108 can form a LTE wireless communication system. In addition, base station 119 can be a NR base station, and UE 101 can wirelessly communicate in a RAT with base station 119 in RAN5, which can be a NG-RAN. Base station 119 and core network 110 can form a NR wireless communication system. Furthermore, base station 115 and the UTRAN, base station 117 and the E-UTRAN, and base station 119 and the NG-RAN are managed by PLMN 105. PLMN 105 can have a priority 109.

According to some aspects, UE 101 can include a timer 131 and UE 101 can be in a state or mode 133. For example, mode 133 can be an enabled mode, a disabled mode, an idle mode, or some other modes. Timer 131 can be used to count an amount of time for UE 101 has been in a mode such as a disable mode with respect to communication in a RAT.

Figure 2A:
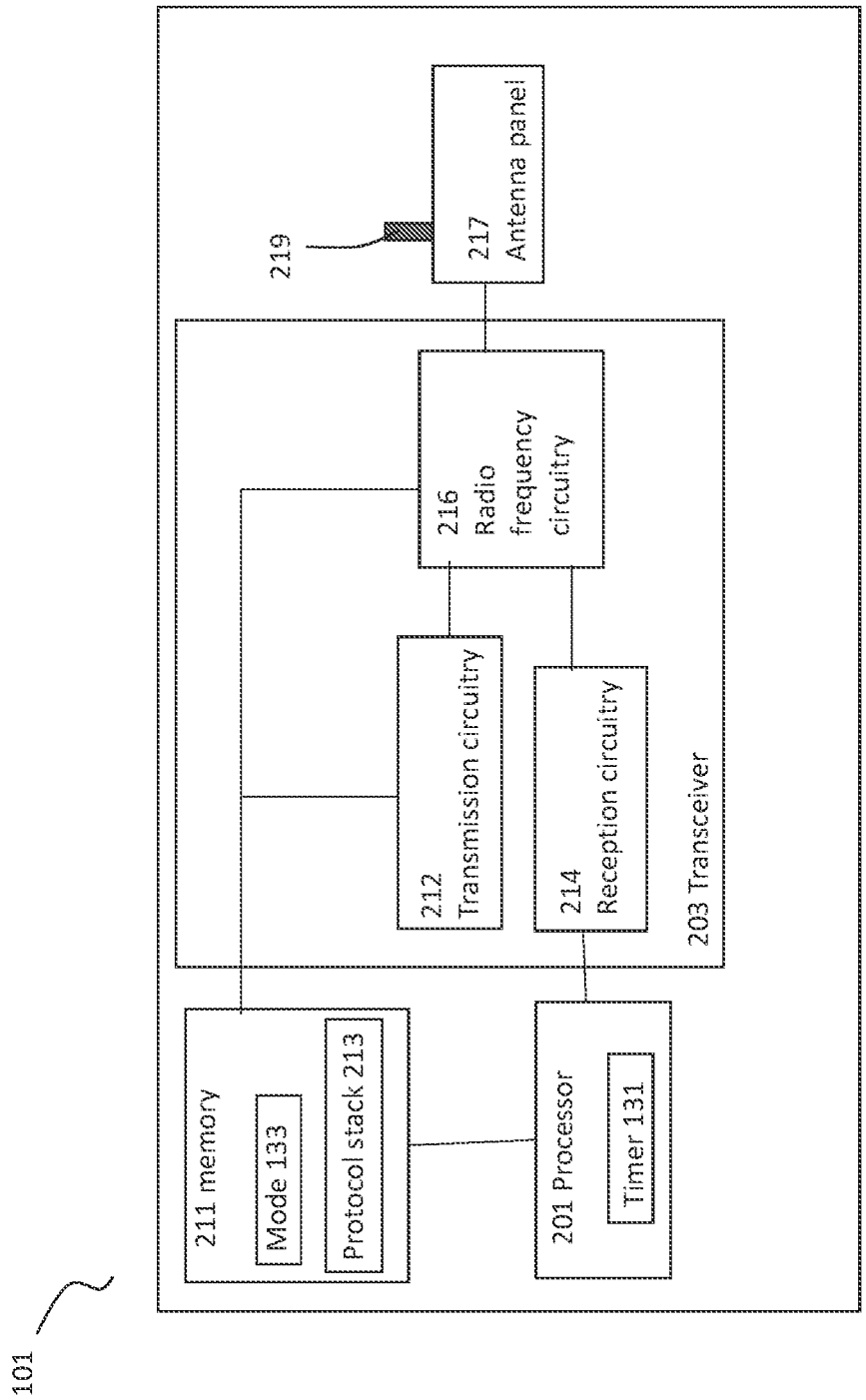
FIGS. 2A-2B illustrate block diagrams of a UE to perform functions described herein, according to some aspects of the disclosure.
Figure 2B:
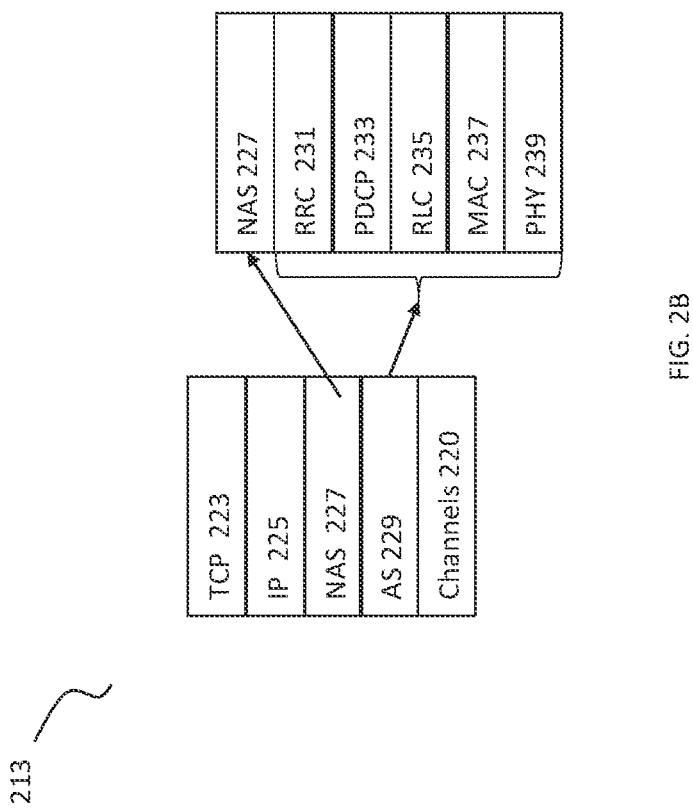

FIGS. 2A-2B illustrate block diagrams of UE 101 to perform functions described herein, according to some aspects of the disclosure.

FIG. 2A illustrates a block diagram of UE 101, having antenna panel 217 including one or more antenna elements, e.g., an antenna element 219 coupled to transceiver 203 and controlled by processor 201. In detail, transceiver 203 can include radio frequency (RF) circuitry 216, baseband transmission circuitry 212, and baseband reception circuitry 214. RF circuitry 216 can include multiple parallel RF chains for one or more of transmit or receive functions, each connected to one or more antenna elements of the antenna panel. In addition, processor 201 can be communicatively coupled to a memory device 211, which are further coupled to transceiver 203. There can be multiple transceivers, which can be similar to transceiver 203, not shown.

In some examples, RF circuitry 216 is used by UE 101 to transmit and receive signals or data. Memory device 211 can store mode 133 and an example protocol stack 213. For example, processor 201 can store mode 133 and operate protocol stack 213. Details of protocol stack 213 are shown in FIG. 2B. Memory device 211 can include instructions, that when executed by the processor 201 perform the functions to recover service in a RAT among multiple RAT technologies. Alternatively, the processor 201 can be "hard-coded" to perform the functions described herein.

FIG. 2B illustrates more details of protocol stack 213. Protocol stack 213 can include a transport (TCP) layer 223, an IP layer 225, a non-access stratum (NAS) layer 227, an access stratum (AS) layer 229, and a channel 220. AS layer 229 can include multiple sublayers, such as RRC layer 231, packet data convergence protocol (PDCP) layer 233, radio link control (RLC) layer 235, medium access control (MAC) layer 237, and physical (PHY) layer 239.

In some examples, the one or more transceivers, e.g., transceiver 203, can enable UE 101 to wirelessly communicate in a first RAT and a second RAT, such as the GSM RAT, the UMTS RAT, the LTE RAT, or the NR RAT. Processor 201 can be configured to implement the timer 131 and perform various operations related to recover service in a RAT among multiple RATs. For example, processor 201 can determine, by NAS layer 227, that timer 131 has expired, where timer 131 is configured to count an amount of time UE 101 has been in a disable mode with respect to communication in the second RAT. In addition, processor 201 can send, by NAS layer 227, responsive to the determination that UE 101 is in the idle mode in the first RAT and timer 131 has expired, a request to RRC layer 231 to perform a cell selection for the second RAT. Afterwards, processor 201 can receive, by NAS layer 227 and from RRC layer 231, an indication that the cell selection has been performed successfully to communicate in the second RAT. RRC layer 231 can send the indication after listening to system information from a base station associated with the second RAT and selecting the base station for wireless communication in the second RAT. In some examples, the selecting the base station for wireless communication in the second RAT can include selecting the base station using a previously stored frequency list or by performing a band search of multiple bands.

Moreover, processor 201 can perform, by NAS layer 227 and responsive to receiving the indication that the cell selection has been performed successfully, a registration procedure with a wireless communication system including the base station to communicate in the second RAT. After performing the registration procedure, processor 201 can receive wireless service from the wireless communication system through the base station associated with the second RAT.

Additionally, processor 201 can perform wireless communication in the first RAT when the UE is in a mode different from the idle mode so that the normal service of UE 201 in the first RAT would not be interrupted. Furthermore, when NAS layer 227 does not receive from RRC layer 231 the indication that the cell selection has been performed successfully to communicate in the second RAT, processor 201 can continue being registered to communicate in the first RAT.

According to some aspects, the first RAT can include UTRAN, or GERAN, while the second RAT can include NG-RAN. In some examples, transceiver 203 can enable UE 101 to wirelessly communicate in LTE E-UTRAN. Processor 201 can select a LTE base station for wireless communication in the LTE E-UTRAN, communicate with the LTE base station in the LTE E-UTRAN, and select a NR base station for wireless communication in NG-RAN after communicating with the LTE base station. Timer 131 can count an amount of time the UE has been in the disable mode with respect to communication in NG-RAN or in LTE E-UTRAN.

Figure 3:
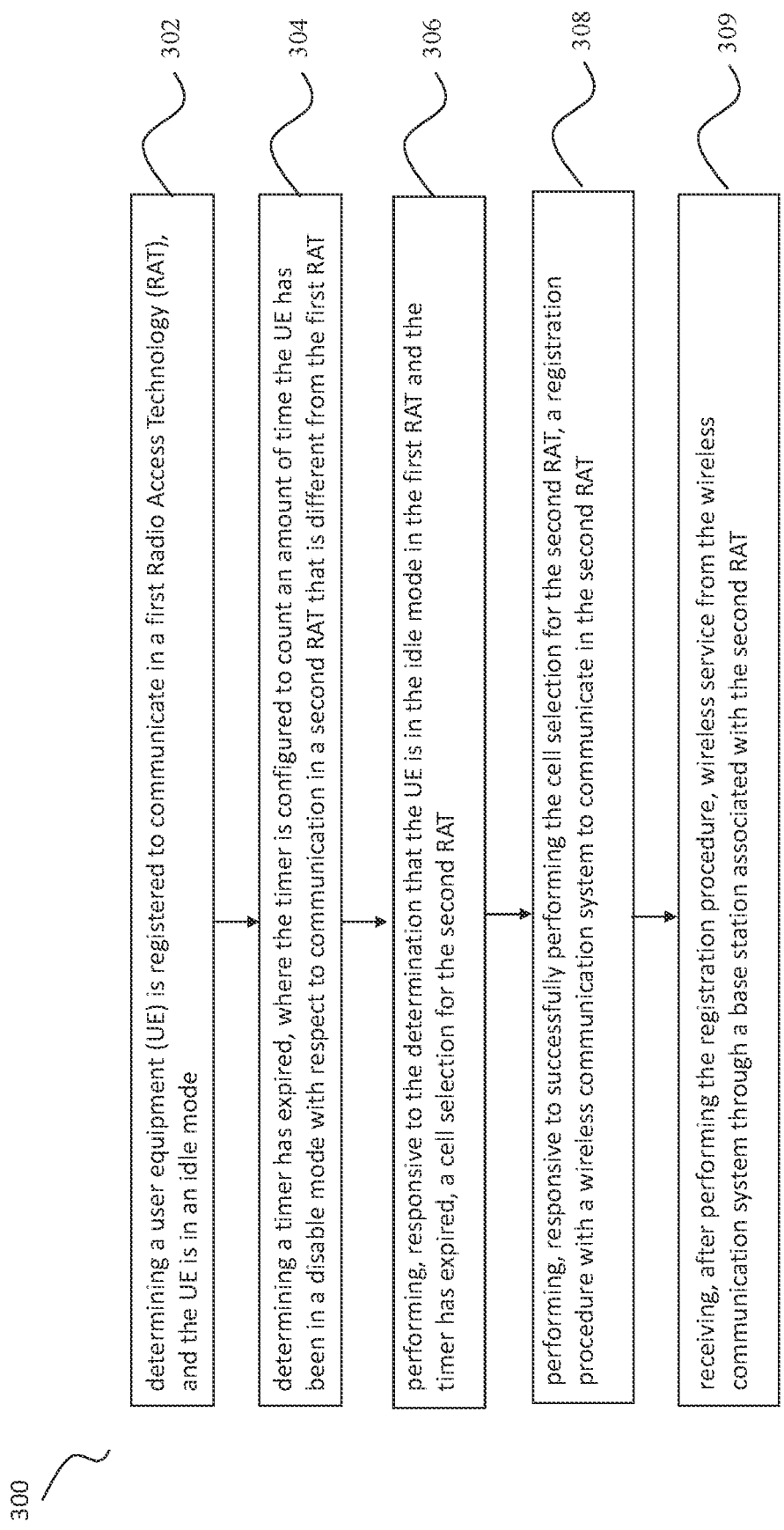
FIG. 3 illustrates an example method performed by a multi-mode UE to recover service in a RAT among multiple RATs, according to some aspects of the disclosure.

FIG. 3 illustrates an example method 300 performed by a multi-mode UE to recover service in a RAT among multiple RATs, according to some aspects of the disclosure. Method 300 can be performed by UE 101 as shown in FIGS. 1 and 2A-2B. For example, the functions of method 300 can performed by processor 201 or caused to be performed by processor 201.

At 302, UE 101 can determine UE 101 is registered to communicate in a first RAT, and UE 101 is in an idle mode. For example, UE 101 can determine UE 101 is registered to communicate in a first RAT, which is the GSM RAT in a GERAN RAN1 including base station 111, as shown in FIG. 1. UE 101 is in an idle mode. UE 101 is a multi-mode UE that can communicate in the first RAT, which is the GSM RAT in a GERAN RAN1, and in the second RAT, which is the NR RAT in a NG-RAN RAN2. For various reasons, UE 101 can be disabled to communicate in the second RAT in RAN2.

At 304, UE 101 can determine a timer has expired, where the timer is configured to count an amount of time UE 101 has been in a disable mode with respect to communication in a second RAT that is different from the first RAT. For example, UE 101 can determine timer 131 has expired, where timer 131 counts an amount of time UE 101 has been in a disable mode with respect to communication in the NR RAT in RAN2. Furthermore, UE 101 can determine that the second RAT in RAN2 has been enabled after the expiration of timer 131.

At 306, UE 101 can perform, responsive to the determination that the UE is in the idle mode in the first RAT and the timer has expired, a cell selection for the second RAT. For example, when it is determined that UE 101 is in the idle mode in the GSM RAT, and timer 131 has expired, UE 101 can perform a cell selection for the NR RAT to recover service in the NR RAT in RAN2. In some example, the cell selection can be performed by listening to system information from base station 113 and selecting base station 113 for wireless communication in the NR RAT.

At 308, UE 101 can perform, responsive to successfully performing the cell selection for the second RAT, a registration procedure with a wireless communication system to communicate in the second RAT. For example, responsive to successfully performing the cell selection for the NR RAT by selecting base station 113 as the serving base station, UE 101 can perform a registration procedure with the wireless communication system including base station 113 to communicate in the NR RAT.

At 309, UE 101 can receive, after performing the registration procedure, wireless service from the wireless communication system through a base station associated with the second RAT. For example, after performing the registration procedure, UE 101 can receive wireless service from the wireless communication system through base station 113 in the NR RAT.

Figure 4:
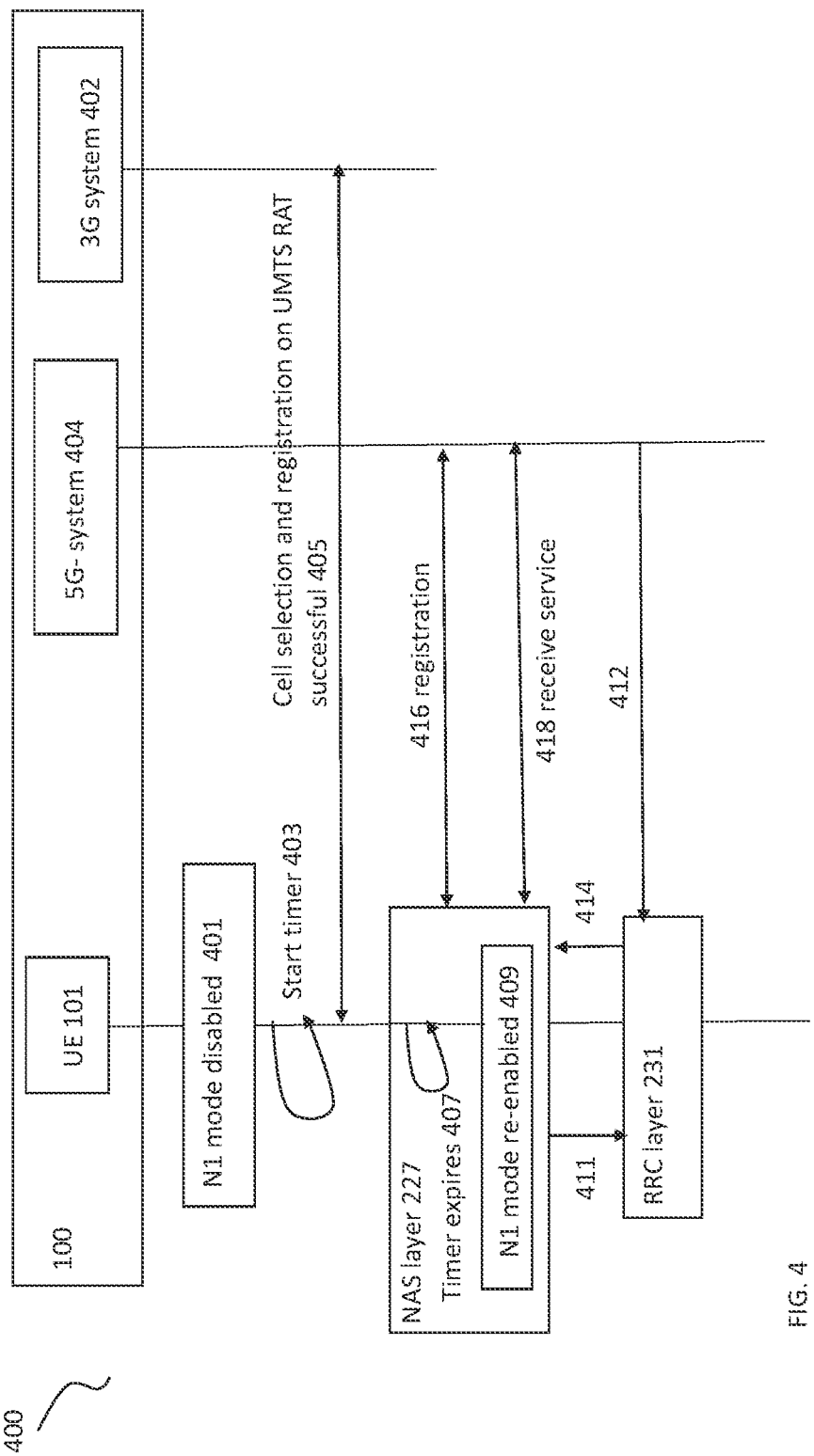
FIGS. 4-6 illustrate example sequence diagrams illustrating operations performed by a multi-mode UE to recover service in a RAT among multiple RATs, according to some aspects of the disclosure.
Figure 5:
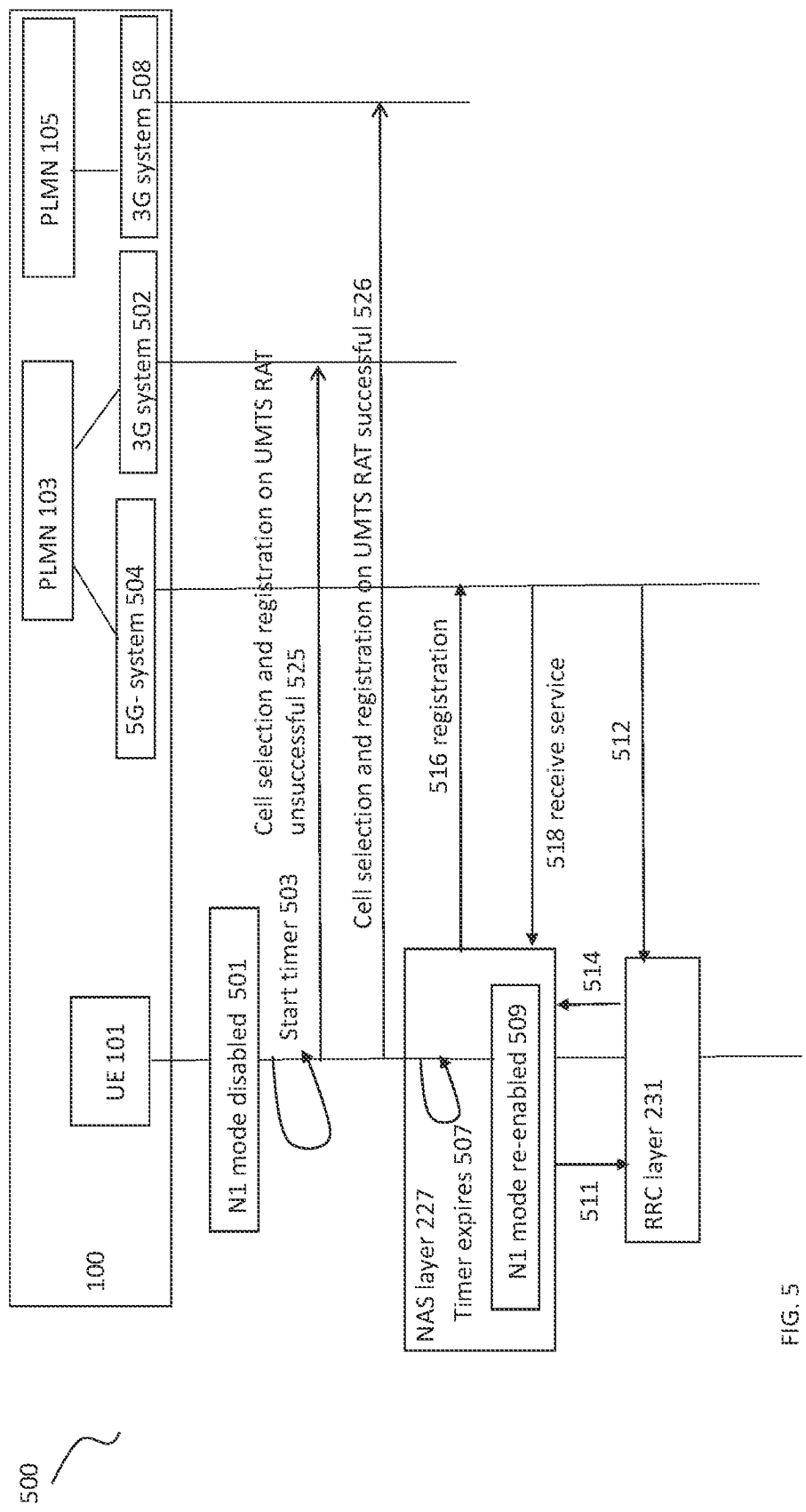
Figure 6:
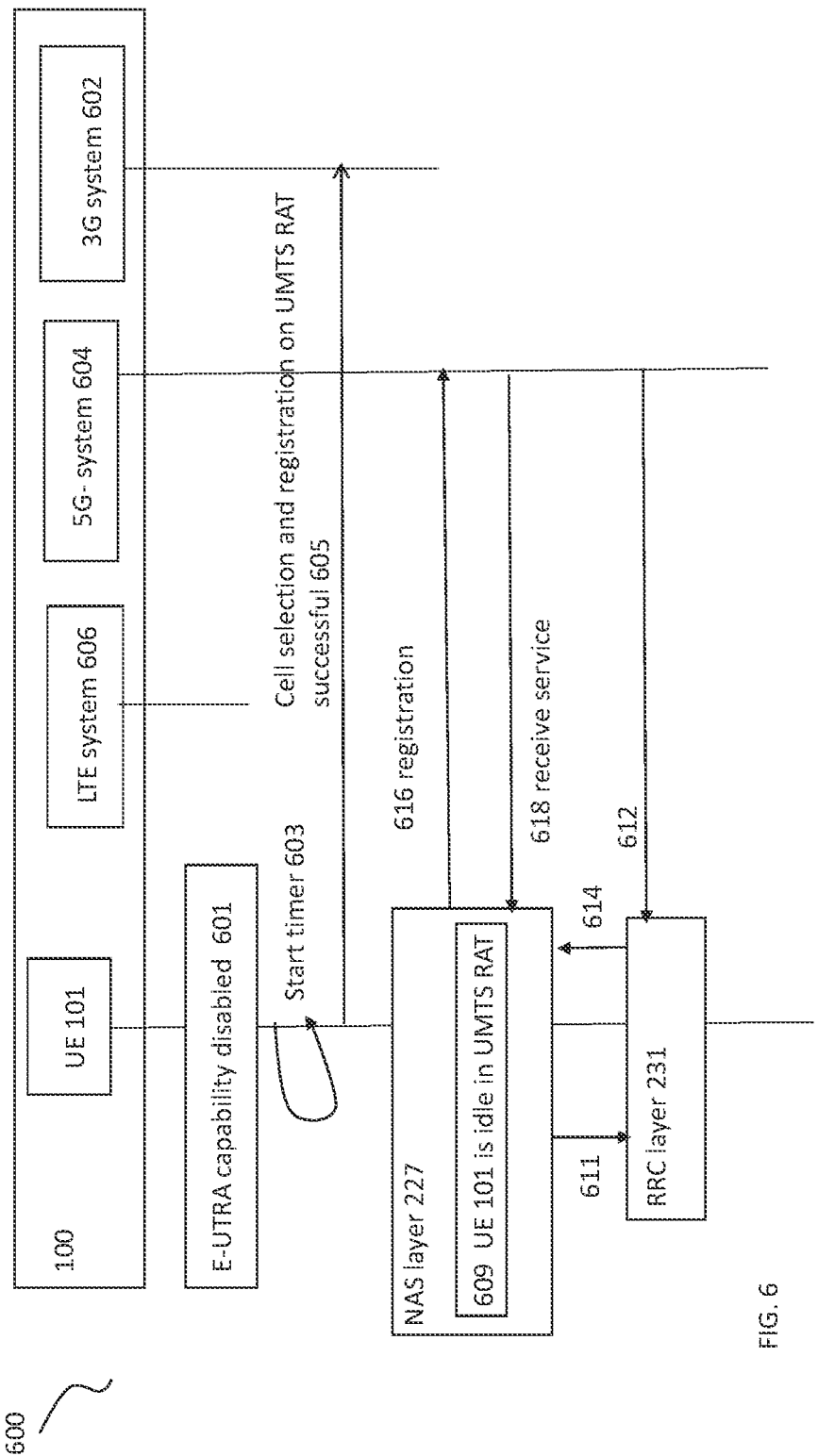

FIGS. 4-6 illustrate example sequence diagrams presenting operations performed by a multi-mode UE to recover service in a RAT among multiple RATs, according to some aspects of the disclosure. Sequence diagrams illustrated in FIGS. 4-6 can be examples of method 300 shown in FIG. 3.

As shown in FIG. 4, sequence diagram 400 illustrates operations performed by UE 101 to recover service in a RAT among multiple RATs. Operations are performed among UE 101, a 3G system 402, and a 5G system 404. 3G system 402 can be an example of UMTS RAN1 that includes base station 111 and core network 102. 5G system 404 can be an example of NR RAN2 that includes base station 113 and core network 104. Both 3G system 402 and 5G system 404 can be coupled to the same PLMN, e.g., PLMN 103.

At 401, UE 101 can disable N1 mode communication in the NR RAT with 5G system 404. At 403, UE 101 can start timer 131 to count an amount of time UE 101 has been in the disable mode with respect to communication in the NR RAT. In embodiments, the timer 131 can be started simultaneously, or near simultaneously, with the disablement of N1 mode communication in the NR RAT with 5G system 404. At 405, UE 101 can select base station 111 and register with 3G system 402 in the UMTS RAT. At 407, NAS layer 227 of UE 101 can determine that timer 131 has expired. At 409, NAS layer 227 of UE 101 can determine the N1 mode is re-enabled to communicate with 5G system 404 in the NR RAT. NAS layer 227 can further detect UE 101 is in an idle mode in the UMTS RAT. Operations performed at 401 to 409 are examples of operations performed at 302 and 304 as described for method 300.

At 411, responsive to the determination that UE 101 is in the idle mode in the UMTS RAT and timer 131 has expired, NAS layer 227 can send a request to RRC layer 231 to perform a cell selection for the NR RAT. At 412, RRC layer 231 can listen to system information from a base station of the NR RAT, e.g., base station 113, and select base station 113 for wireless communication in the NR RAT with 5G system 404. Operations performed at 411 and at 412 are examples of operations performed at 306 as described for method 300. In addition, in embodiments, operations at 411 and at 412 are performed when UE 101 is in the idle mode in the UMTS RAT during the idle discontinuous reception (DRX) duration, hence no service in the UMTS RAT is interrupted, and operations at 411 and at 412 are performed at the background of the UMTS RAT. For example, paging and other activities of the UMTS RAT are not disturbed. Alternatively, UE 101 can continue to perform wireless communication in the UMTS RAT with 3G system 402 when UE 101 is in a mode different from the idle mode.

At 414, NAS layer 227 can receive from RRC layer 231, an indication that the cell selection has been performed successfully to communicate in the NR RAT. At 416, NAS layer 227 can perform a registration procedure with 5G system 404 to communicate in the NR RAT. Operations performed at 414 and at 416 are examples of operations performed at 308 as described for method 300. Alternatively, when the cell selection has not been performed successfully to communicate in the NR RAT, UE 101 can remain registered on the UMTS RAT with 3G system 402.

At 418, assuming successful registration with the 5G system 404, the NAS layer 227 can receive wireless service from 5G system 404 through base station 113 in the NR RAT. Operations performed at 418 are examples of operations performed at 309 as described for method 300. Since UE 101 can receive wireless service from 5G system 404 through base station 113 in the NR RAT, the service in the NR RAT on UE 101 has been recovered.

According to some aspects, operations illustrated in sequence diagram 400 are only for examples, and are not limiting. For example, in some examples, 3G system 402 can be replaced by a 2G GSM system. In addition, there can be more systems, e.g., a LTE system included in the wireless system 100 besides 3G system 402 and 5G system 404.

According to some aspects, operations illustrated in sequence diagram 400 can be applicable in various scenarios. For example, in one scenario, UE 101 can disable N1 mode in the NR RAT on Home PLMN, and camp on the LTE RAT but TAU or ATTACH procedure on the LTE RAT is not successful. In other similar scenarios, when a voice centric device does not find voice service on LTE, then UE will disable LTE RAT (E-UTRA capability). Similarly on NR RAT, when a voice centric device does not find voice service on NR RAT, then UE will disable NR RAT. Afterwards, UE 101 can camp on the GSM or UMTS RAT of the Home PLMN. When the N1 mode disable timer expires, UE 101 re-enables N1 mode and remains camped on the GSM or the UMTS RAT even when the NR RAT is enabled since E-UTRA capability is disabled. In another scenario, UE 101 can disable N1 mode in the NR RAT on Home PLMN and Home PLMN does not have the LTE RAT deployed in the location. Hence, UE 101 camps on the GSM or the UMTS RAT of the Home PLMN. When the N1 mode disable timer expires, UE 101 re-enables N1 mode and remains camped on the GSM or the UMTS RAT even when NR RAT is enabled since no LTE RAT is deployed. The described scenarios are examples of operations performed at 401, 403, and 405.

As shown in FIG. 5, sequence diagram 500 illustrates operations performed by UE 101 to recover service in a RAT among multiple RATs. Operations are performed among UE 101, a 3G system 502, a 5G system 504, and a 3G system 508. 3G system 502 can be an example of UMTS RAN1 that includes base station 111 and core network 102. 5G system 504 can be an example of NR RAN2 that includes base station 113 and core network 104. Both 3G system 502 and 5G system 504 can be coupled to the same PLMN, e.g., PLMN 103. In addition, 3G system 508 can be an example of UMTS RAN3 that includes base station 115 and core network 106, which are coupled to PLMN 105. Some operations illustrated in sequence diagram 500 can be similar to operations shown in FIG. 4.

At 501, UE 101 can disable N1 mode communication in the NR RAT with 5G system 504. At 503, UE 101 can start timer 131 to count an amount of time UE 101 has been in the disable mode with respect to communication in the NR RAT. In embodiments, the timer 131 can be started simultaneously, or near simultaneously, with the disablement of N1 mode communication in the NR RAT with 5G system 504.

At 525, UE 101 can first select base station 111 and register with 3G system 502 in the UMTS RAT. However, the operations at 525 can be unsuccessful. Afterwards, at 526, UE 101 can select base station 115, register with 3G system 508 in the UMTS RAT in RAN3, and camp on 3G system 508. 3G system 508 belongs to PLMN 105, different from PLMN 103 coupled to 5G system 404. In some examples, PLMN 103 can have a priority equal to or higher than PLMN 105.

At 507, NAS layer 227 of UE 101 can determine that timer 131 has expired. At 509, NAS layer 227 of UE 101 can determine the N1 mode is re-enabled to communicate with 5G system 504 in the NR RAT. NAS layer 227 can further detect UE 101 is in an idle mode in the UMTS RAT.

At 511, responsive to the determination that UE 101 is in the idle mode in the UMTS RAT and timer 131 has expired, NAS layer 227 can send a request to RRC layer 231 to perform a cell selection for the NR RAT. At 512, RRC layer 231 can listen to system information from a base station of the NR RAT, e.g., base station 113, and select base station 113 for wireless communication in the NR RAT with 5G system 504. RRC layer 231 can select base station 113 by listening to multiple base stations managed by PLMN 103 and select base station 113 based on some predetermined criteria on PLMN 103 either using an earlier stored frequency list or by doing a frequency band search. Alternatively, UE 101 can continue to perform wireless communication in the UMTS RAT with 3G system 508 when UE 101 is in a mode different from the idle mode.

At 514, NAS layer 227 can receive from RRC layer 231, an indication that the cell selection has been performed successfully to communicate in the NR RAT. At 516, NAS layer 227 can perform a registration procedure with 5G system 504 to communicate in the NR RAT. Alternatively, when the cell selection has not been performed successfully to communicate in the NR RAT, UE 101 can remain registered on the UMTS RAT with the 3G system 508. At 518, assuming successful registration with the 5G system 504, the NAS layer 227 can receive wireless service from 5G system 504 through base station 113 in the NR RAT. Since UE 101 can receive wireless service from 5G system 504 through base station 113 in the NR RAT, the service in the NR RAT on UE 101 has been recovered.

According to some aspects, operations illustrated in sequence diagram 500 are only for examples, and are not limiting. For example, in some examples, 3G system 502 can be a GSM(2G) system instead of a UMTS(3G) system. In addition, there can be more systems, e.g., a LTE system included in the wireless system 100 besides 3G system 502 and 5G system 504.

According to some aspects, operations illustrated in sequence diagram 500 can be applicable in various scenarios. For example, in one scenario, UE 101 can disable N1 mode in the NR RAT on VPLMN-1, e.g., PLMN 103 (roaming case). Afterwards, UE 101 can find a base station managed by a different VPLMN-2, e.g., PLMN 105 and camp on the base station on the LTE RAT and the TAU procedure on the LTE RAT is successful. When the N1 mode disable timer for PLMN 103 expires, UE continues to remain camped on PLMN 105 even when it can find service on PLMN 103 (the NR RAT). If VPLMN-1, e.g., PLMN 103, has a higher priority as compared to VPLMN-2, e.g., PLMN 105, UE 101 will wait for a High Priority PLMN (HPPLMN) search timer to camp on VPLMN-1, where the HPPLMN search timer can be in the order of minimum 6 minutes or more (typically about 30 mins or more in multiple of 6 minutes) based on higher priority PLMN search timer duration read from SIM EF-EF$_{HPPLMN}$. Another scenario can be similar to the above scenario, except that UE 101 camps on the UMTS or GSM RAT on VPLMN-2 instead of the LTE RAT. Another scenario can be similar to the above scenario, except that no priority relation is defined between VPLMN-1 and VPLMN-2. Hence, UE may not start HPPLMN search timer. Operations illustrated in sequence diagram 500 can be applicable in additional scenarios, such as scenarios similar to the above scenarios except that UE 101 is camped on the LTE RAT on VPLMN-1 and LTE RAT is disabled by UE 101 in place of the NR RAT being disabled.

As shown in FIG. 6, sequence diagram 600 illustrates operations performed by UE 101 to recover service in a RAT among multiple RATs. Operations are performed among UE 101, a 3G system 602, a 5G system 604, and a LTE system 606. 3G system 602 can be an example of UMTS RAN3 that includes base station 115 and core network 106. 5G system 604 can be an example of NR RAN5 that includes base station 119 and core network 110. LTE system 606 can be an example of LTE RAN4 that includes base station 117 and core network 108. 3G system 602, 5G system 604, and LTE system 606 can be coupled to the same PLMN, e.g., PLMN 105. Some operations illustrated in sequence diagram 600 can be similar to operations shown in FIGS. 4-5.

At 601, UE 101 can disable LTE E-UTRA communication in the LTE RAT with LTE system 606. For example, UE 101 can temporarily disable the LTE RAT when maximum attach attempts have been reached, when IMS voice over LTE is not available in the registration area, or when the UE registration is rejected due to network congestion, load resulting in temporary failures, or other abnormal rejection causes.

At 603, UE 101 can start timer 131 to count an amount of time UE 101 has been in the disable mode with respect to communication in the LTE RAT. In embodiments, the timer 131 can be started simultaneously, or near simultaneously, with the disablement of communication with the LTE RAT associated with LTE system 606. When timer 131 expires, UE 101 can re-enable LTE RAT. During the time when the LTE RAT is disabled, at 605, UE 101 can select base station 115 and register with 3G system 602 in the UMTS RAT. In addition, during the time when the LTE RAT is disabled, if NR cells are available, UE 101 cannot perform a direct cell re-selection to move to the NR RAT from GSM/UMTS RATs since the current 3GPP specifications have not defined such direct interworking between GSM/UMTS and NR RATs. The only method defined in the current systems to return to the NR RAT service is re-selection to the LTE RAT and then from the LTE RAT on to the NR RAT. Since the LTE RAT is disabled, NR re-selection would not be triggered. UE 101 may remain camped on GSM/UMTS RATs for a longer period of time even when NR service is available in a coverage area, leading to degrade of user experience and customer dissatisfaction.

According to some aspects, operations illustrated in sequence diagram 600 can be applicable in various scenarios. For example, in one scenario, UE 101 can disable the LTE RAT and E-UTRA capability on Home PLMN. The UE 101 cannot camp on NR cell and instead registers on the UMTS or GSM RAT of the Home PLMN. The UE 101 remains camped on the UMTS/GSM RAT even when NR cells become available in mobility condition (since E-UTRA capability is disabled). In another scenario, UE 101 can disable the LTE RAT and E-UTRA capability on Home PLMN, the UE 101 cannot camp on any NR/UMTS/GSM cells on home PLMN, and UE 101 camps and registers on the UMTS or GSM RAT of VPLMN. The UE 101 remains camped on the UMTS/GSM RAT on VPLMN even when NR cells become available on HPLMN in mobility condition (since E-UTRA capability is disabled).

Embodiments herein present operations to recover the NR RAT service via a proactive attempt by the UE to trigger background NR cell selection or PLMN selection when the LTE RAT and E-UTRA capability is disabled. When the E-UTRA capability is disabled and UE is registered on the GSM/UMTS RAT in idle mode, if the UE is registered on the GSM/UMTS RAT on the PLMN where the E-UTRA capability for 3GPP access is disabled, UE can trigger background cell selection on the NR RAT on that PLMN. If the UE is registered on GSM/UMTS on a different PLMN from where E-UTRA capability for 3GPP access is disabled, UE can trigger background PLMN selection to acquire service on the NR RAT. Details of some operations are illustrated below.

At 609, NAS layer 227 of UE 101 can determine UE 101 is in an idle mode in the UMTS RAT. Operations at 609 can be performed after the LTE RAT has been disabled, and do not need to wait till timer 131 to expire. Hence, operations at 609 are different from operations described in FIGS. 4-5.

At 611, responsive to the determination that UE 101 is in the idle mode in the UMTS RAT, NAS layer 227 can send a request to RRC layer 231 to perform a cell selection for the NR RAT. At 612, RRC layer 231 can listen to system information from a base station of the NR RAT, e.g., base station 119, and select base station 119 for wireless communication in the NR RAT with 5G system 604. Alternatively, UE 101 can continue to perform wireless communication in the UMTS RAT with 3G system 602 when UE 101 is in a mode different from the idle mode.

At 614, NAS layer 227 can receive from RRC layer 231, an indication that the cell selection has been performed successfully to communicate in the NR RAT. At 616, NAS layer 227 can perform a registration procedure with 5G system 604 to communicate in the NR RAT. Alternatively, when the cell selection has not been performed successfully to communicate in the NR RAT, UE 101 can remain registered on the UMTS RAT with the 3G system 602. At 618, NAS layer 227 can receive wireless service from 5G system 604 through base station 119 in the NR RAT. Since UE 101 can receive wireless service from 5G system 604 through base station 119 in the NR RAT, the service in the NR RAT on UE 101 has been recovered.

According to some aspects, operations illustrated in sequence diagram 600 are only for examples, and are not limiting. For example, in some examples, 3G system 602 can be replaced by a 2G GSM system.

FIGS. 4-6 have illustrated operations to recover service for the NR RAT when the N1 mode is disabled or the LTE RAT is disabled. Embodiments herein present operations to recover the NR RAT service via a proactive attempt by the UE to trigger background NR cell selection or PLMN selection when the E-UTRA capability is disabled. Similar operations can be performed when the packet switching (PS) domain is disabled.

UE can disable the PS Domain in certain scenarios such as registration being rejected. In such cases, UE can disable the PS domain as it is not allowed to camp for normal service but can camp on circuit switching (CS) Domain RATs such as the GSM and UMTS RATs for only CS service. Until the T3245 timer is running, UE is only allowed to access "limited service" on the PS RATs. Upon expiry of the timer T3245, UE can consider PS domain as VALID and can camp on the NR/LTE RAT. When PS domain is disabled, UE can only register on the UMTS/GSM RAT on same or any PLMN to receive only CS domain service for voice calls. After the T3245 timer expires, the PS domain is re-enabled, if NR cells are available, UE cannot perform a direct cell re-selection to move to the NR RAT from GSM/UMTS RATs. UE may remain camped on GSM/UMTS RATs for a longer period of time in good NR coverage leading to degrade of user experience & customer dissatisfaction. If LTE RAT is present in the location, then UE will have to register first on LTE and then re-select to NR RAT, thereby taking more time for UE to regain NR service.

Embodiments herein can perform operations for the NR RAT service recovery in this scenario via a proactive attempt by the UE to trigger background NR cell selection if the UE is camped in service on UMTS or GSM RATs or foreground NR cell selection if UE is camped in "Limited Service" or PLMN selection. The UE can trigger background NR cell selection or foreground NR cell selection when the T3245 timer expires, and the PS domain is considered "valid" again for PS services. The foreground search can be performed when the UE does not need to listen paging channels, and is applicable when UE is camped in "limited service" or "No Service".

Figure 7:
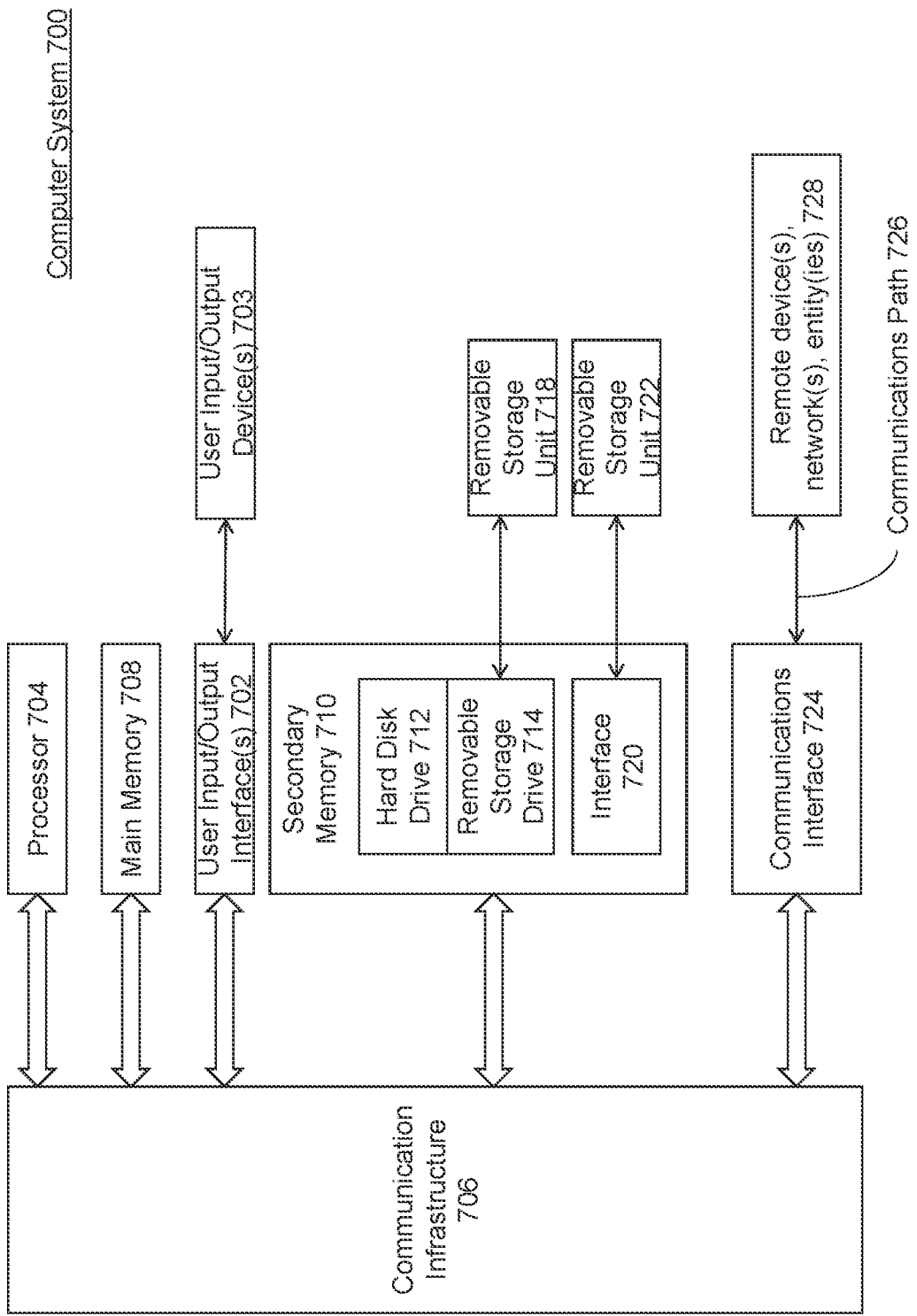
FIG. 7 is an example computer system for implementing some aspects or portion(s) thereof of the disclosure provided herein.

Various aspects can be implemented, for example, using one or more computer systems, such as computer system 700 shown in FIG. 7. Computer system 700 can be any computer capable of performing the functions described herein such as UE 101, base station 111, base station 113, base station 115, base station 117, and base station 119 as shown in FIG. 1 and FIGS. 2A-2B. Computer system 700 includes one or more processors (also called central processing units, or CPUs), such as a processor 704. Processor 704 is connected to a communication infrastructure 706 (e.g., a bus). Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 708, the removable storage unit 718, the removable storage unit 722 can store instructions that, when executed by processor 704, cause processor 704 to perform operations for a UE or a base station, e.g., UE 101, base station 111, base station 113, base station 115, base station 117, and base station 119 as shown in FIG. 1 and FIGS. 2A-2B. In some examples, the operations include those operations illustrated and described in FIGS. 3-6.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726. Operations of the communication interface 724 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A multi-mode user equipment (UE), comprising:
one or more transceivers configured to enable the multi-mode UE to wirelessly communicate in a first Radio Access Technology (RAT) and a second RAT; and
a processor communicatively coupled to the one or more transceivers and configured to:
 determine, by a non-access stratum (NAS) layer of a protocol stack operated on the multi-mode UE, that the multi-mode UE is registered to communicate in the first RAT, and the multi-mode UE is in an idle mode with respect to communication in the first RAT;
 determine, by the NAS layer, a timer has expired, wherein the timer is configured to count an amount of time the multi-mode UE has been in a disable mode with respect to communication in the second RAT;
 send, by the NAS layer, responsive to the determination that the multi-mode UE is in the idle mode with respect to the communication in the first RAT and the timer has expired, a request to a radio resource control (RRC) layer of the protocol stack to perform a cell selection for the second RAT;
 receive, by the NAS layer and from the RRC layer, an indication that the cell selection has been performed successfully for the communication in the second RAT;
 perform, by the NAS layer and responsive to receiving the indication that the cell selection has been performed successfully, a registration procedure with a wireless communication system to communicate in the second RAT; and
 receive, after performing the registration procedure, wireless service from the wireless communication system through a base station associated with the second RAT.

2. The multi-mode UE of claim 1, wherein the processor is further configured to:
 listen, by the RRC layer, to system information from the base station associated with the second RAT;
 select, by the RRC layer, the base station for wireless communication in the second RAT; and
 send, by the RRC layer to the NAS layer, the indication that the cell selection has been performed successfully for the communication in the second RAT.

3. The multi-mode UE of claim 1, wherein to select the base station for wireless communication in the second RAT, the processor is configured to select the base station by using a previously stored frequency list or by performing a frequency band search of multiple frequency bands.

4. The multi-mode UE of claim 1, wherein the multi-mode UE communicates in the first RAT with a public land mobile network (PLMN), and the processor is configured to perform the registration procedure with the wireless communication system to communicate in the second RAT with the same PLMN.

5. The multi-mode UE of claim 1, wherein the multi-mode UE communicates in the first RAT with a first public land mobile network (PLMN), and the multi-mode UE has been in the disable mode to communicate in the second RAT with a second PLMN different from the first PLMN.

6. The multi-mode UE of claim 1, wherein the multi-mode UE communicates in the first RAT with a first public land mobile network (PLMN), and the processor is configured to perform the registration procedure with the wireless communication system to communicate in the second RAT with a second PLMN different from the first PLMN.

7. The multi-mode UE of claim 6, wherein the first PLMN has a first priority, and the second PLMN has a second priority equal to or higher than the first priority.

8. The multi-mode UE of claim 1, wherein the processor is further configured to:
 perform wireless communication in the first RAT responsive to a determination that the multi-mode UE is in a mode different from the idle mode.

9. The multi-mode UE of claim 1, wherein the processor is further configured to:
 continue being registered to communicate in the first RAT, responsive to the NAS layer not receiving from the RRC layer the indication that the cell selection has been performed successfully to communicate in the second RAT.

10. The multi-mode UE of claim 1, wherein the first RAT includes Universal Mobile Telecommunications System (UMTS) Terrestrial Radio Access Network (UTRAN), or Global System for Mobiles (GSM) Edge Radio Access Network (GERAN), and the second RAT includes new radio (NR) next generation Radio Access Network (NG-RAN).

11. The multi-mode UE of claim 10, wherein the processor is configured to perform the registration procedure with the wireless communication system to communicate in the second RAT without having Long-Term Evolution (LTE) Evolved UTRAN (E-UTRAN) available or having E-UTRAN disabled for the multi-mode UE.

12. A method for a user equipment (UE), comprising:
 determining the UE is registered to communicate in a first Radio Access Technology (RAT), and the UE is in an idle mode with respect to communication in the first RAT;
 determining a timer has expired, wherein the timer is configured to count an amount of time the UE has been in a disable mode with respect to communication in a second RAT, wherein the second RAT is different from the first RAT;
 performing, responsive to the determination that the UE is in the idle mode in the first RAT and the timer has expired, a cell selection for the second RAT;
 performing, responsive to successfully performing the cell selection for the second RAT, a registration procedure with a wireless communication system associated with the second RAT; and
 receiving, after performing the registration procedure, wireless service from the wireless communication system through a base station associated with the second RAT.

13. The method of claim 12, wherein the performing the cell selection comprises listening to system information from the base station associated with the second RAT and selecting the base station for wireless communication in the second RAT.

14. The method of claim 12, wherein the UE communicates in the first RAT with a public land mobile network (PLMN), and the performing the registration procedure comprises performing the registration procedure with the wireless communication system to communicate in the second RAT with the same PLMN.

15. The method of claim 12, wherein the UE communicates in the first RAT with a first public land mobile network (PLMN), and the UE has been in the disable mode to communicate in the second RAT with a second PLMN different from the first PLMN.

16. The method of claim 12, wherein the UE communicates in the first RAT with a first public land mobile network (PLMN), and the performing the registration procedure with the wireless communication system comprises performing the registration procedure with the wireless communication system to communicate in the second RAT with a second PLMN different from the first PLMN.

17. The method of claim 12, wherein the first RAT includes Universal Mobile Telecommunications System (UMTS) Terrestrial Radio Access Network (UTRAN), or Global System for Mobiles (GSM) Edge Radio Access Network (GERAN), and the second RAT includes new radio (NR) next generation Radio Access Network (NG-RAN).

18. The method of claim 17, wherein the performing the registration procedure with the wireless communication system to communicate in the second RAT includes performing the registration procedure without having Long-Term Evolution (LTE) Evolved UTRAN (E-UTRAN) available or having E-UTRAN disabled for the UE.

19. A non-transitory computer-readable medium storing instructions that, when executed by a processor of a user equipment (UE), cause the UE to perform operations, the operations comprising:

determining the UE is registered to communicate in a first Radio Access Technology (RAT), and the UE is in an idle mode with respect to communication in the first RAT;

determining a timer has expired, wherein the timer is configured to count an amount of time that the UE has been in a disable mode with respect to communication in a second RAT, wherein the second RAT is different from the first RAT;

performing, responsive to the determination that the UE is in the idle mode in the first RAT and the timer has expired, a cell selection for the second RAT;

performing, responsive to cell selection for the second RAT, a registration procedure with a wireless communication system to communicate in the second RAT; and receiving, after performing the registration procedure, wireless service from the wireless communication system through a base station associated with the second RAT.

20. The non-transitory computer-readable medium of claim 19, the operations further comprising:

performing wireless communication in the first RAT responsive to a determination that the UE is in a mode different from the idle mode; and continue being registered to communicate in the first RAT, responsive to the cell selection for the second RAT not being successful.

* * * * *